May 29, 1928.
E. J. GROTJAHN
1,671,823
OIL SHIELD
Filed July 10, 1926
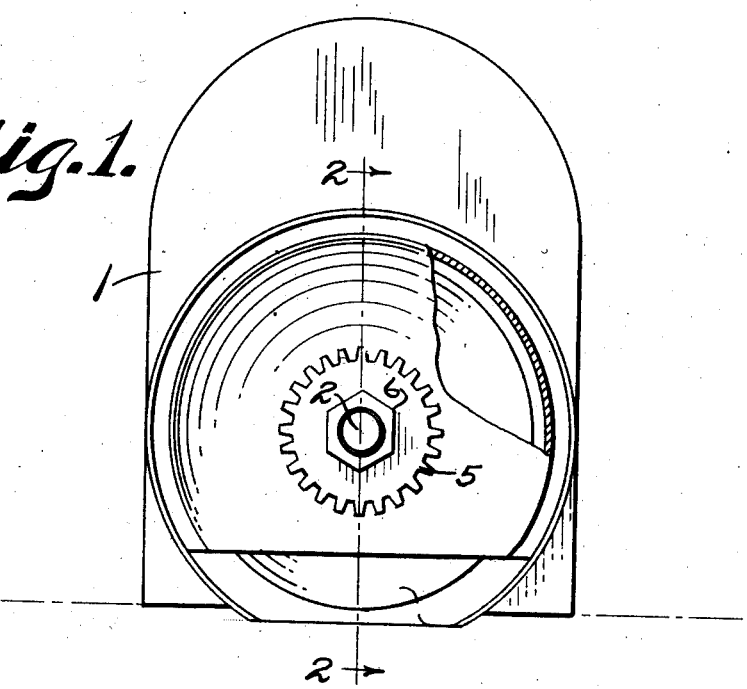
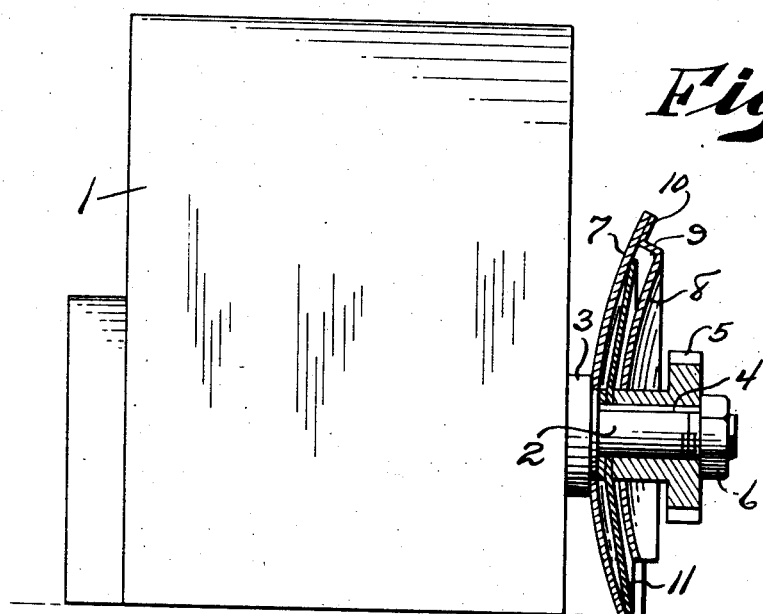
Edwin J. Grotjahn INVENTOR
BY Victor J. Evans
ATTORNEY
WITNESS:

Patented May 29, 1928.

1,671,823

UNITED STATES PATENT OFFICE.

EDWIN J. GROTJAHN, OF GILMANTON, WISCONSIN.

OIL SHIELD.

Application filed July 10, 1926. Serial No. 121,688.

The magneto for the engine of harvesting machines or the like absorbs oil, between the intermeshing gears of the engine driven shaft and the magneto shaft, with the result that the parts of the magneto become clogged and frequently short circuited. It may, therefore, be considered the object of this invention to produce an extremely simple, cheaply constructed, but novel and effective shield for preventing oil or like lubricant entering the magneto casing through the opening or bearing of the shaft therefor.

To the attainment of the above broadly stated object and others which will appear as the nature of the invention is better understood, the improvement resides in the construction, combination and operative association of parts, a satisfactory embodiment of which is disclosed by the accompanying drawings.

In the drawings:

Figure 1 is a front elevation of a magneto provided with the improvement, parts of the latter being in section.

Figure 2 is a sectional view through the improvement, approximately on the line 2—2 of Figure 1.

While my improvement is primarily devised for use with magnetos employed in connection with engines on harvesting or like farming machines, it is to be understood that the invention is not to be thus restricted, as the same may be successfully employed in connection with magnetos which are elsewhere used.

Referring now to the drawings in detail, the numeral 1 designates the magneto casing and 2 the shaft therefor. The shaft is received through a bearing 3 on one side of the magneto casing 1. The shaft has a spline 4 that is received in a key-way in the hub of the usual toothed drive wheel 5, and the outer end of the shaft is threaded and has screwed thereon a nut 6 which holds the wheel on the shaft.

The shield comprises a hollow member and the inner and outer walls thereof are concavo convex cross section. The inner disc 7 of the shield is fixedly secured on the bearing 3, while the outer disc 8 of the shield has an opening that receives therethrough the hub of the toothed wheel 5. The outer wall or disc 8 has an inwardly directed rim 9 that merges into a flange 10 which is fixed on the inner wall of the disc 7 of the shield. The lower portion of the shield is cut-away transversely, and therefor open. The shaft 2 has a shoulder that is contacted by the inner face of a disc 11, the said disc being fixed on the shaft 2. The disc 11 is also of concavo convex formation and has a peripheral contact with the inner disc or wall 7 of the shield, and this contacting engagement prevents the passage of oil or grease between the disc 11 and the inner wall of the shield, and consequently prevents such oil or grease from entering the magneto and gumming the parts thereof or short circuiting the same.

Having described the invention, I claim:—

An oil shield comprising an inner concavo-convex disc adapted to be secured to the bearing of a magneto shaft, an outer disc fitting snugly around the shaft, a flange on the periphery of the outer disc, said flange secured to the inner disc throughout its extent except for an opening formed in the bottom, and an intermediate resilient disc abutting a shoulder formed on the shaft, the periphery of the intermediate disc contacting with the inner disc throughout its extent whereby the oil is thrown off by the outer disc, the intermediate disc being an additional safeguard.

In testimony whereof I affix my signature.

EDWIN J. GROTJAHN.